Sept. 13, 1932.  A. O. AUSTIN  1,876,586
JOINT FOR INSULATORS
Filed Sept. 26, 1929
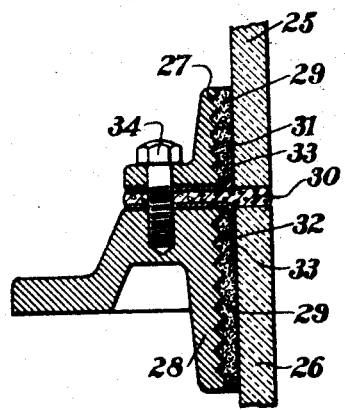
INVENTOR
Arthur O. Austin
BY  Alpheus J. Crane
ATTORNEY Patented Sept. 13, 1932

1,876,586

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

JOINT FOR INSULATORS

Application filed September 26, 1929. Serial No. 395,376.

This invention relates to electrical apparatus and especially to joints between parts of insulator constructions.

One object of the invention is to provide a joint between fragile members that will not subject the members to excessive stresses but will nevertheless provide a tight connection.

Another object is to provide a joint that will allow for unequal contraction and expansion of the parts.

Other objects and advantages will appear from the following description.

The invention is exemplified in the combination and arrangement of parts shown in the accompanying drawing and described in the following specification, and it is more particularly pointed out in the appended claims.

In the drawing:

The figure is a vertical sectional view of a portion of an insulator construction showing one embodiment of the present invention.

In high voltage insulator members, particularly bushings, it is sometimes necessary to use rather large masses of metal, in connection with the dielectric member, which may be porcelain, glass or other fragile material. This dielectric member usually has a much smaller linear coefficient of expansion than the metal, so that temperature changes will cause it to expand and contract less than the metal conducting parts or metal attachments.

Where the parts are subject to wide variations in temperature or where the metal parts are of considerable size, there may be a very appreciable movement of the metal parts relative to the dielectric parts. If provision is not made for this relative expansion or contraction, the dielectric parts may be damaged or the joints between the metal and dielectric members loosened. Where two parts of an insulator construction are drawn together by bolts or screws to form a liquid tight joint, as in the case of oil containing bushings, damage may sometimes be done by pressing the porcelain parts too tightly together.

The present invention provides means for maintaining a tight joint between the porcelain members without subjecting them to the high mechanical stresses incident to great pressure. The invention may be applied to various forms of high voltage insulators such as the joint between the conducting members and the dielectric members in bushings, between the holding members and dielectric members in the case of pin insulators, bushings, suspension insulators and other insulating structures or between dielectric members, such as the baffles in bushings or between the members in pin insulators. Other applications of the invention will readily suggest themselves to those skilled in the art.

In the form of the invention illustrated in the drawing the numerals 25 and 26 designate the upper and lower porcelain members of a bushing insulator, said members having metallic flanges 27 and 28 respectively, secured to their connected rims by cement 29. A gasket 30 of cork or other suitable material is interposed between the flanges 27 and 28 and between the adjacent rims of the dielectric members. Difficulty has sometimes been experienced in providing a perfectly oil tight joint between the members 25 and 26. If the parts are clamped together with sufficient force to compress the gasket between the edges of the dielectric members sufficiently to prevent leakage at this point, the pressure produces stresses in the dielectric members which may cause cracking or breaking. If the joint is not oil tight at this point, the oil may escape past the edges of the dielectric members and penetrate the cement joints 29. There is no difficulty in compressing the gasket with sufficient metal flanges upon the gasket with sufficient force to prevent escape between the metal flanges, but more difficulty is experienced in making the cement joints 29 sufficiently tight to prevent escape of oil. This difficulty is overcome in the present invention by the introduction of thin metal baffles 31 and 32. These baffles are soldered to the dielectric members 25 and 26 at 33, and are bent outwardly to engage the opposite surfaces of the gasket 30 between the gasket and the metal flanges. The connection at 33 may be made by metalizing the surfaces of the members 25 and 26, as described in my prior Patent 1,536,749, May 5, 1925, and then soldering the baffles 31 and 32 to the metalized surfaces, as more fully described and claimed in my prior application Serial Number 361,204, filed May 7, 1929. The metal flanges may be permitted to project slightly beyond the rims of the dielectric members so that when the parts are tightened by the cap screws 34, greater pressure will be exerted upon the gasket between the metal flanges than between the edges of the dielectric members. In this way, the joint is made oil tight between the metal flanges without exerting undue pressure on the dielectric members, and any oil which may pass the edges of the dielectric members is prevented from escape through the cement joints 39 by the thin sheet metal baffles 31 and 32.

Various other applications of the invention and various changes in details of construction falling within the spirit and scope of the invention will readily suggest themselves to those skilled in the art.

I claim:

1. A bushing insulator comprising a pair of dielectric members, metallic fittings secured to each of said dielectric members, sheet metal baffles soldered to each of said dielectric members and spanning the joint between the respective dielectric members and their fittings and extending between said fittings, and means for clamping said fittings to each other to hold said dielectric members together.

2. A bushing insulator comprising a pair of dielectric members, a flange cemented to each of said dielectric members, a sheet metal baffle soldered to the surface of each dielectric member and extending between the dielectric member and the cement holding the dielectric member to the flange and engaging the flange secured to said dielectric member and bridging the joint between the dielectric member and its flange, a gasket interposed between said flanges, and means for clamping said flanges to each other to hold said dielectric members together.

3. An insulator bushing comprising a pair of dielectric members, metallic flanges cemented to said dielectric members, sheet metal baffles soldered to said dielectric members and extending between said flanges and spanning the joints between said dielectric members and flanges, means for clamping said flanges together to connect mechanically said dielectric members, and a gasket interposed between said flanges, the portion of the gasket between said flanges being gripped by said flanges and receiving the major portion of the pressure exerted on said flanges for holding said dielectric members together.

4. A bushing insulator comprising dielectric bell members having confronting edges, flanges cemented to said bell members adjacent said edges, means for clamping said flanges together for mechanically connecting said bell members, packing interposed between said flanges to form a fluid tight joint and receiving the major portion of the force exerted on said flanges by said clamping means to relieve the bell members of the major portion of said force, and a baffle bridging the cement joint between at least one of said flanges and its bell member and soldered to the last said bell member adjacent the confronting edges of said bell members to render the cement joint water tight.

5. Means for connecting two dielectric members comprising metallic fittings cemented to said members adjacent opposed surfaces thereof, a metal baffle soldered to one of said dielectric members and extending between said metal fittings and bridging the joint between said dielectric member and its fitting, and means for clamping said fittings together with said baffle extending therebetween.

In testimony whereof I have signed my name to this specification this 24th day of September A. D. 1929.

ARTHUR O. AUSTIN.